(12) United States Patent
Huang et al.

(10) Patent No.: US 8,450,872 B2
(45) Date of Patent: May 28, 2013

(54) VERTICAL WIND POWER GENERATOR WITH AUTOMATICALLY UNSTRETCHABLE BLADES

(75) Inventors: Tzu-Yao Huang, Taichung (TW); Tso-Cheng Hsiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 409 days.

(21) Appl. No.: 12/972,443

(22) Filed: Dec. 18, 2010

(65) Prior Publication Data

US 2012/0119502 A1     May 17, 2012

(51) Int. Cl.
| | |
|---|---|
| *F03D 9/00* | (2006.01) |
| *H02P 9/04* | (2006.01) |
| *F03D 7/00* | (2006.01) |
| *B63H 3/00* | (2006.01) |
| *B64C 1/00* | (2006.01) |
| *F03B 7/00* | (2006.01) |

(52) U.S. Cl.
USPC ............. 290/55; 290/44; 415/4.2; 416/51; 416/175

(58) Field of Classification Search
USPC ............. 290/44, 55; 415/4.2; 416/51, 175
See application file for complete search history.

(56) References Cited

U.S. PATENT DOCUMENTS

| | | | | |
|---|---|---|---|---|
| 1,100,332 | A | * | 6/1914 | Smith ............................ 416/175 |
| 1,697,574 | A | * | 1/1929 | Savonius ..................... 416/110 |
| 1,766,765 | A | * | 6/1930 | Savonius ................. 416/132 R |
| 3,902,072 | A | * | 8/1975 | Quinn ............................ 290/44 |
| 3,918,839 | A | * | 11/1975 | Blackwell et al. ............. 416/175 |
| 3,942,909 | A | * | 3/1976 | Yengst ....................... 416/132 B |
| 4,023,368 | A | * | 5/1977 | Kelly ............................. 60/698 |
| 4,037,989 | A | * | 7/1977 | Huther ....................... 416/197 A |
| 4,039,849 | A | * | 8/1977 | Mater et al. ..................... 290/55 |
| 4,082,479 | A | * | 4/1978 | Rangi et al. ..................... 416/23 |
| 4,118,637 | A | * | 10/1978 | Tackett ............................ 290/55 |
| 4,236,866 | A | * | 12/1980 | Zapata Martinez ............. 415/4.4 |
| 4,247,252 | A | * | 1/1981 | Seki et al. ........................ 416/44 |
| 4,247,253 | A | * | 1/1981 | Seki et al. ........................ 416/44 |
| 4,248,568 | A | * | 2/1981 | Lechner .................... 416/132 B |
| 4,274,809 | A | * | 6/1981 | Delgado et al. ................. 416/117 |
| 4,281,965 | A | * | 8/1981 | Stjernholm ............... 416/227 A |
| 4,285,636 | A | * | 8/1981 | Kato et al. ................ 416/197 A |
| 4,293,274 | A | * | 10/1981 | Gilman ........................... 416/51 |
| 4,299,537 | A | * | 11/1981 | Evans ............................ 416/119 |
| 4,329,116 | A | * | 5/1982 | Ljungstrom ..................... 416/19 |
| 4,452,568 | A | * | 6/1984 | Andersson ................... 416/119 |
| 4,456,429 | A | * | 6/1984 | Kelland ........................ 416/117 |
| 4,500,257 | A | * | 2/1985 | Sullivan .......................... 416/32 |
| 4,525,124 | A | * | 6/1985 | Watson et al. ............. 416/132 B |
| 4,575,311 | A | * | 3/1986 | Wood ........................ 416/170 R |
| 4,609,827 | A | * | 9/1986 | Nepple ............................ 290/44 |
| 4,624,624 | A | * | 11/1986 | Yum ............................... 416/87 |
| 4,718,822 | A | * | 1/1988 | Riezinstein ................... 416/119 |

(Continued)

*Primary Examiner* — Pedro J Cuevas
(74) *Attorney, Agent, or Firm* — Guice Patents PLLC

(57) ABSTRACT

A vertical wind power generator with automatically unstretchable blades is disclosed. The vertical wind power generator includes a generator, a linkage mechanism, a lifting type blade assembly, a resistance type blade assembly and a drive unit. The drive unit provides power for driving the linkage mechanism. The drive unit has an output shaft movable between a first position and a second position. When the output shaft is moved to the first position, the linkage mechanism is driven to move the resistance type blades to a stretched position. When the output shaft is moved to the second position, the linkage mechanism is driven to move the resistance type blades to an unstretched position.

6 Claims, 4 Drawing Sheets

U.S. PATENT DOCUMENTS

| | | | | |
|---|---|---|---|---|
| D300,932 S * | 5/1989 | Sikes | | D15/1 |
| 4,979,871 A * | 12/1990 | Reiner | | 415/4.2 |
| 5,133,637 A * | 7/1992 | Wadsworth | | 415/4.4 |
| 5,171,127 A * | 12/1992 | Feldman et al. | | 416/119 |
| 5,183,386 A * | 2/1993 | Feldman et al. | | 416/119 |
| 5,226,806 A * | 7/1993 | Lubbers | | 416/132 B |
| 5,252,029 A * | 10/1993 | Barnes | | 416/142 |
| 5,463,257 A * | 10/1995 | Yea | | 290/55 |
| 5,503,530 A * | 4/1996 | Walters | | 416/197 A |
| 5,664,418 A * | 9/1997 | Walters | | 60/398 |
| 6,242,818 B1 * | 6/2001 | Smedley | | 290/44 |
| 6,465,899 B2 * | 10/2002 | Roberts | | 290/44 |
| 6,808,366 B2 * | 10/2004 | Sikes | | 416/1 |
| 6,884,020 B2 * | 4/2005 | Kaare et al. | | 415/1 |
| 6,910,873 B2 * | 6/2005 | Kaliski | | 418/267 |
| 6,913,435 B2 * | 7/2005 | Seki | | 415/4.1 |
| D509,794 S * | 9/2005 | Okubo et al. | | D13/115 |
| D511,495 S * | 11/2005 | Okubo et al. | | D13/115 |
| 7,126,235 B2 * | 10/2006 | Bernhoff et al. | | 290/44 |
| 7,144,214 B2 * | 12/2006 | Kinpara et al. | | 415/4.4 |
| 7,303,369 B2 * | 12/2007 | Rowan et al. | | 415/4.2 |
| 7,323,791 B2 * | 1/2008 | Jonsson | | 290/55 |
| 7,329,965 B2 * | 2/2008 | Roberts et al. | | 290/55 |
| 7,344,353 B2 * | 3/2008 | Naskali et al. | | 415/4.2 |
| 7,417,334 B2 * | 8/2008 | Uchiyama | | 290/55 |
| 7,582,977 B1 * | 9/2009 | Dehlsen | | 290/1 R |
| 7,696,635 B2 * | 4/2010 | Boone | | 290/55 |
| 7,874,787 B2 * | 1/2011 | Morris | | 415/4.2 |
| 7,896,609 B2 * | 3/2011 | Mitchell et al. | | 415/4.2 |
| 7,927,078 B2 * | 4/2011 | Parsania et al. | | 416/235 |
| 7,942,624 B1 * | 5/2011 | Erb | | 415/4.2 |
| 7,944,069 B2 * | 5/2011 | Uchiyama | | 290/44 |
| 7,948,101 B2 * | 5/2011 | Burtch | | 290/44 |
| 7,948,110 B2 * | 5/2011 | Morgan et al. | | 290/55 |
| 7,980,810 B2 * | 7/2011 | Unno | | 415/4.2 |
| 7,982,329 B2 * | 7/2011 | Lin et al. | | 290/55 |
| 7,988,413 B2 * | 8/2011 | Haar | | 416/31 |
| 8,013,464 B2 * | 9/2011 | Stern et al. | | 290/55 |
| 8,030,792 B2 * | 10/2011 | Haar | | 290/44 |
| 8,038,490 B1 * | 10/2011 | Vanderhye et al. | | 440/8 |
| 8,051,625 B2 * | 11/2011 | Leijon et al. | | 52/847 |
| 8,084,881 B2 * | 12/2011 | Morgan et al. | | 290/55 |
| 8,164,213 B2 * | 4/2012 | Mahaffy et al. | | 290/55 |
| 8,215,897 B2 * | 7/2012 | Douglass et al. | | 415/4.2 |
| 8,226,348 B2 * | 7/2012 | Scerbina | | 415/4.2 |
| 8,226,369 B2 * | 7/2012 | Clark | | 416/236 R |
| 8,232,664 B2 * | 7/2012 | Stroup et al. | | 290/55 |
| 8,258,647 B2 * | 9/2012 | Haar | | 290/55 |
| 8,322,035 B2 * | 12/2012 | Yan | | 29/889.21 |
| 8,373,294 B2 * | 2/2013 | Haar | | 290/44 |
| 8,376,688 B2 * | 2/2013 | Haar | | 415/66 |
| 8,397,382 B2 * | 3/2013 | Anasis et al. | | 29/889.1 |
| 2005/0151376 A1 * | 7/2005 | Bernhoff et al. | | 290/44 |
| 2005/0200134 A1 * | 9/2005 | Shibata et al. | | 290/55 |
| 2006/0257240 A1 * | 11/2006 | Naskali et al. | | 415/4.4 |
| 2007/0029807 A1 * | 2/2007 | Kass | | 290/55 |
| 2007/0040385 A1 * | 2/2007 | Uchiyama | | 290/44 |
| 2007/0098563 A1 * | 5/2007 | Rowan et al. | | 416/244 R |
| 2007/0189889 A1 * | 8/2007 | Yokoi | | 415/4.4 |
| 2007/0224029 A1 * | 9/2007 | Yokoi | | 415/4.2 |
| 2007/0231139 A1 * | 10/2007 | Yokoi | | 416/119 |
| 2007/0269311 A1 * | 11/2007 | Browning | | 416/132 B |
| 2008/0145224 A1 * | 6/2008 | Mitchell et al. | | 416/132 B |
| 2008/0213083 A1 * | 9/2008 | Unno | | 415/4.2 |
| 2008/0286112 A1 * | 11/2008 | Rowan et al. | | 416/244 R |
| 2008/0309090 A1 * | 12/2008 | Stern et al. | | 290/55 |
| 2009/0015015 A1 * | 1/2009 | Joutsiniemi | | 290/54 |
| 2009/0016891 A1 * | 1/2009 | Parsania et al. | | 416/223 R |
| 2009/0072544 A1 * | 3/2009 | Pao | | 290/55 |
| 2009/0097981 A1 * | 4/2009 | Gabrys | | 416/204 R |
| 2009/0100676 A1 * | 4/2009 | Yan | | 29/889 |
| 2009/0220339 A1 * | 9/2009 | Wu et al. | | 416/1 |
| 2009/0220342 A1 * | 9/2009 | Wu et al. | | 416/124 |
| 2009/0250938 A1 * | 10/2009 | Stone, Jr. | | 290/55 |
| 2009/0257880 A1 * | 10/2009 | Clark | | 416/223 R |
| 2010/0050500 A1 * | 3/2010 | Pieraccini | | 44/300 |
| 2010/0104441 A1 * | 4/2010 | Manley et al. | | 416/200 R |
| 2010/0123317 A1 * | 5/2010 | Leijon et al. | | 290/55 |
| 2010/0133829 A1 * | 6/2010 | Bertenyi | | 290/44 |
| 2010/0133846 A1 * | 6/2010 | Lin et al. | | 290/55 |
| 2010/0133852 A1 * | 6/2010 | Preus | | 290/55 |
| 2010/0150728 A1 * | 6/2010 | Douglass et al. | | 416/223 R |
| 2010/0170164 A1 * | 7/2010 | Leijon et al. | | 52/40 |
| 2010/0196144 A1 * | 8/2010 | Morris | | 415/147 |
| 2010/0230972 A1 * | 9/2010 | Haar | | 290/55 |
| 2010/0230975 A1 * | 9/2010 | Schmitt et al. | | 290/55 |
| 2010/0295316 A1 * | 11/2010 | Grassman | | 290/55 |
| 2010/0296913 A1 * | 11/2010 | Lee | | 415/4.2 |
| 2011/0006526 A1 * | 1/2011 | Hemmingsson | | 290/44 |
| 2011/0084495 A1 * | 4/2011 | Wu et al. | | 290/55 |
| 2011/0121580 A1 * | 5/2011 | Morgan et al. | | 290/55 |
| 2011/0133474 A1 * | 6/2011 | Haar | | 290/55 |
| 2011/0142659 A1 * | 6/2011 | Janiuk | | 416/223 R |
| 2011/0164977 A1 * | 7/2011 | Vallejo | | 416/145 |
| 2011/0167633 A1 * | 7/2011 | Anasis et al. | | 29/889.1 |
| 2011/0206526 A1 * | 8/2011 | Roberts | | 416/223 R |
| 2011/0221202 A1 * | 9/2011 | Bernhoff | | 290/55 |
| 2011/0260455 A1 * | 10/2011 | Haar | | 290/44 |
| 2011/0260463 A1 * | 10/2011 | Haar | | 290/55 |
| 2011/0262276 A1 * | 10/2011 | Haar | | 416/202 |
| 2012/0014791 A1 * | 1/2012 | Hine et al. | | 416/1 |
| 2012/0051913 A1 * | 3/2012 | Haar | | 416/146 R |
| 2012/0082562 A1 * | 4/2012 | Kotler | | 416/93 R |
| 2012/0121340 A1 * | 5/2012 | Pao | | 405/203 |
| 2012/0155058 A1 * | 6/2012 | Pujol Artigas | | 362/35 |
| 2012/0183407 A1 * | 7/2012 | Vallejo | | 416/228 |
| 2012/0195761 A1 * | 8/2012 | Nouris | | 416/205 |
| 2012/0201687 A1 * | 8/2012 | Song et al. | | 416/227 R |
| 2012/0207600 A1 * | 8/2012 | Harris et al. | | 416/1 |
| 2012/0207605 A1 * | 8/2012 | Hessamodini | | 416/196 A |
| 2012/0219426 A1 * | 8/2012 | Hessamodini | | 416/232 |
| 2012/0306215 A1 * | 12/2012 | Wesby et al. | | 290/55 |
| 2013/0036601 A1 * | 2/2013 | Blanc | | 29/596 |
| 2013/0049373 A1 * | 2/2013 | Lee | | 290/55 |

* cited by examiner

VERTICAL WIND POWER GENERATOR WITH AUTOMATICALLY UNSTRETCHABLE BLADES

BACKGROUND OF THE INVENTION

1. Field of the Invention

The present invention relates generally to a wind power generation system, and more particularly to a vertical wind power generator with automatically unstretchable blades.

2. Description of the Related Art

Recently, energy saving and environmental protection issues have been more and more emphasized. To cope with greenhouse effect and reduce discharge of carbon dioxide, almost all the countries over the world have positively developed natural resource power generation as substitute and renewable energy sources, including wind power, solar energy, seawater, etc. In these natural resources, the wind power generation technique is the most mature measure and has widest application range. Moreover, the cost for wind power generation is relative low.

A wind power generator operates in such a manner that the blades are driven and rotated by airflow to convert the kinetic energy of the wind into useful mechanical energy or electrical energy. The wind power generators can be divided into horizontal wind power generators and vertical wind power generators according to the relative positions between the shaft of the generator and the horizon. The power generation efficiency of the horizontal wind power generator is higher than that of the vertical wind power generator. However, the rotational faces of the blades of the horizontal wind power generator must face the wind to achieve better power generation efficiency. Therefore, the horizontal wind power generator has more complicated structure and is manufactured at higher cost. The vertical wind power generator has poorer power generation efficiency. However, the rotational shaft of the vertical wind power generator is normal to the horizon. In this case, the blades of the generator can be rotated by the wind in any direction to generate power. Moreover, the vertical wind power generator has the advantages of smaller radius of gyration, simplified structure, low noise and better appearance. Therefore, the vertical wind power generator is more applicable to those sites with limited wind area and rapidly changed wind direction and wind speed, such as the roof of an urban building.

The vertical wind power generators can be divided into lifting type and resistance type according to the working principle of the blades. The lifting type blades are driven and rotated by lifting force and have faster rotational speed as well as better rotational efficiency. On the other hand, the resistance type blades are driven and rotated under the resistance and have larger torque and better actuation ability. These two types of blades have their advantages respectively. Therefore, some modern vertical wind power generators are equipped with both resistance type blades and lifting type blades to achieve the objects of low wind speed actuation and high rotational speed power generation. However, at high rotational speed, the resistance type blades will apply a resistance to the entire wind power generation system against the rotation. This will reduce the rotational efficiency and lower the power generation efficiency.

SUMMARY OF THE INVENTION

It is therefore a primary object of the present invention to provide a vertical wind power generator with automatically unstretchable blades. At high rotational speed, the resistance type blades of the generator are unstretched to reduce the resistance applied by the resistance type blades to the system.

It is a further object of the present invention to provide the above vertical wind power generator with automatically unstretchable blades, which has higher power generation efficiency.

To achieve the above and other objects, the vertical wind power generator with automatically unstretchable blades of the present invention includes a generator, a linkage mechanism, a lifting type blade assembly, a resistance type blade assembly and a drive unit. The drive unit provides power for driving the linkage mechanism. The drive unit has an output shaft movable between a first position and a second position. When the output shaft is moved to the first position, the linkage mechanism is driven to move the resistance type blades to a stretched position. When the output shaft is moved to the second position, the linkage mechanism is driven to move the resistance type blades to an unstretched position.

The present invention can be best understood through the following description and accompanying drawings, wherein:

DETAILED DESCRIPTION OF THE PREFERRED EMBODIMENTS

Figure 1:
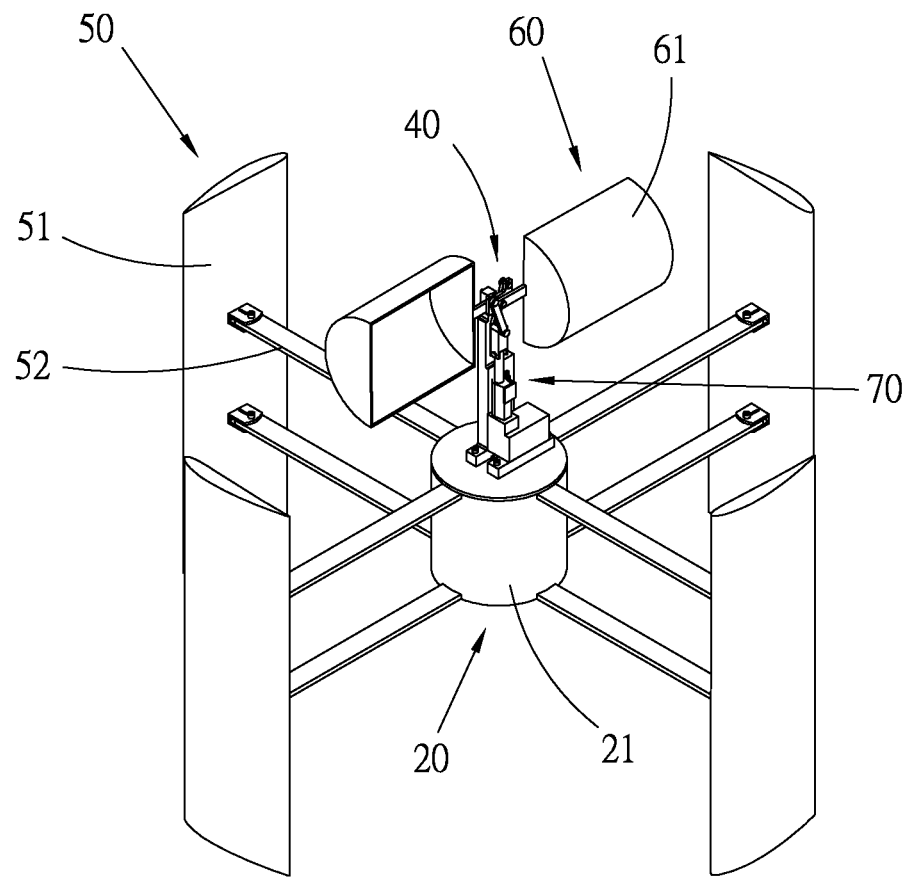
FIG. 1 is a perspective assembled view of a preferred embodiment of the present invention.
Figure 2:
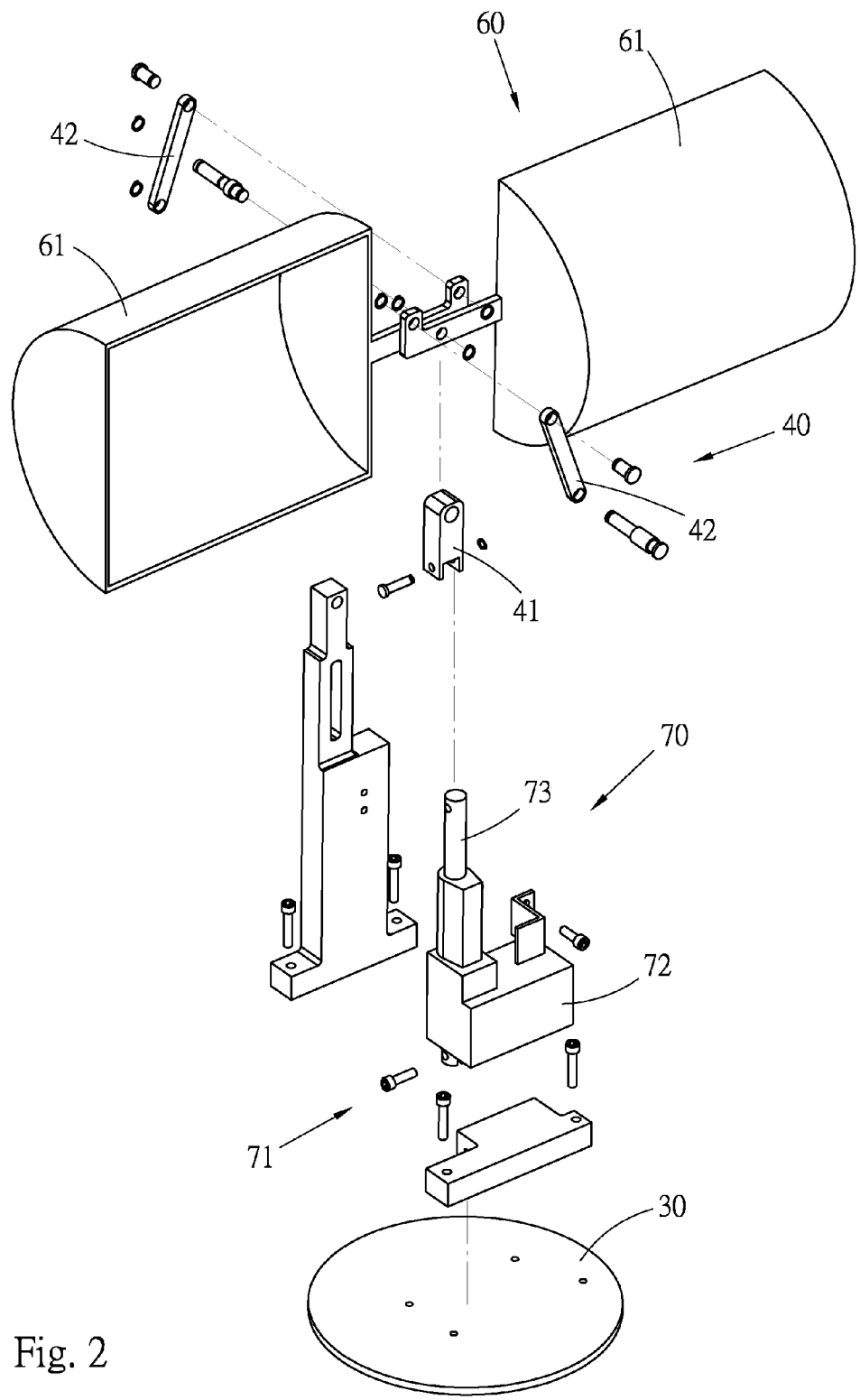
FIG. 2 is a perspective exploded view of a part of the preferred embodiment of the present invention.

Please refer to FIGS. 1 to 5. According to a preferred embodiment, the vertical wind power generator 10 with automatically unstretchable blades of the present invention includes an outer rotor generator 20, a disc seat 30, a linkage mechanism 40, a lifting type blade assembly 50, a resistance type blade assembly 60 and a drive unit 70.

The outer rotor generator 20 is composed of a stator (not shown) and a rotary section 21. The stator is disposed in the generator 20, while the rotary section 21 is disposed around the stator. The rotational shaft of the rotary section 21 is normal to the horizon. Such generator pertains to prior art and is not included in the scope of the present invention. Therefore, the structure of the generator will not be further described hereinafter.

The disc seat 30 has a circular form and is correspondingly disposed on an end face of the generator 20. The disc seat 30 is connected with the rotary section 21 and synchronously coaxially rotatable therewith.

The linkage mechanism 40 is mounted on the disc seat 30 in a predetermined position.

The lifting type blade assembly 50 includes several elongated lifting type blades 51 and several brackets 52 respectively bridged between the lifting type blades 51 and the rotary section 21.

The resistance type blade assembly 60 includes two semi-cylindrical resistance type blades 61, which are symmetrically positioned on two sides of the rotational shaft of the rotary section 21 and connected with the linkage mechanism 40.

The drive unit 70 serves to provide power for driving the linkage mechanism 40. The drive unit 70 has a main body 71 mounted on the disc seat 30, an actuator 72 disposed on the main body 71 and an output shaft 73 drivable by the actuator 72 to reciprocally move between a first position and a second position. When the output shaft 73 is moved to the first position, the linkage mechanism 40 is driven to move the resistance type blades 61 to a stretched position where the resistance type blades 61 are symmetrically positioned on two sides of the rotational shaft of the rotary section 21. When the output shaft 73 is moved to the second position, the linkage mechanism 40 is driven to move the resistance type blades 61 to an unstretched position where the resistance type blades 61 are mated with each other about the rotational shaft of the rotary section 21.

To speak more specifically, the linkage mechanism 40 includes a base section 41 disposed at an end of the output shaft 73 of the actuator 72, and two links 42 each having a first end and a second end. The first ends of the links 42 are respectively pivotally connected to two sides of the base section 41. The second ends of the links 42 are respectively pivotally connected to the two resistance type blades 61.

Figure 3:
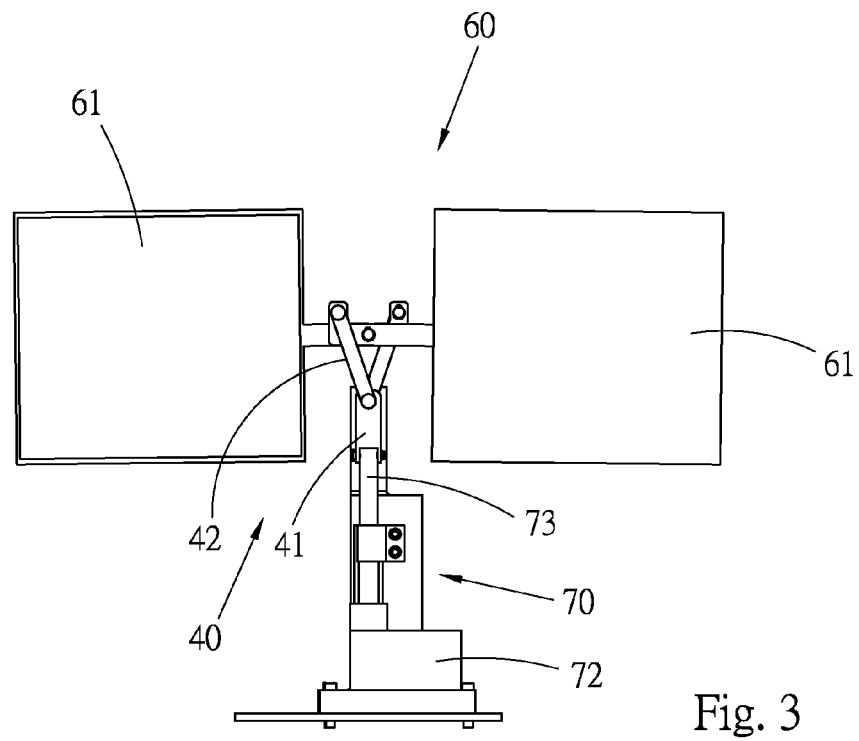
FIG. 3 is a plane view of the preferred embodiment of the present invention, showing that the output shaft of the drive unit is positioned in a first position.
Figure 5:
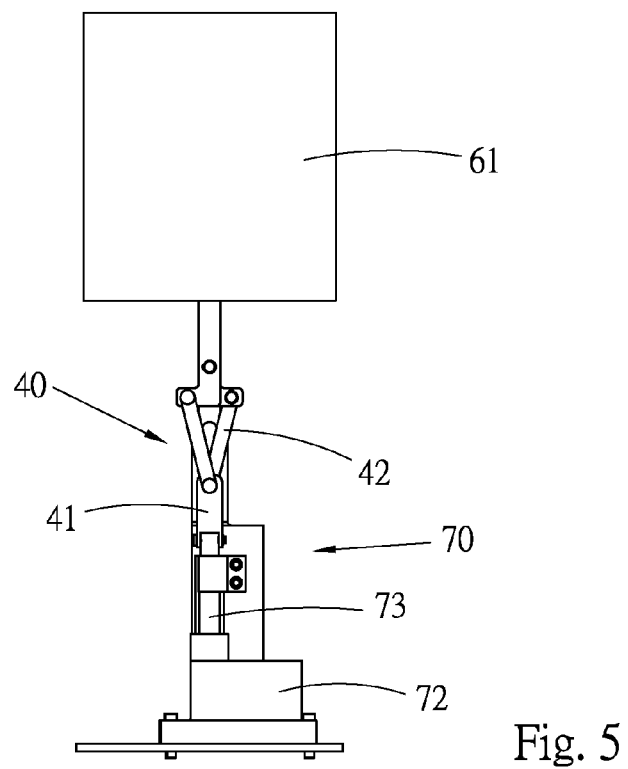
FIG. 5 is a plane view of the preferred embodiment of the present invention, showing that the output shaft of the drive unit is positioned in the second position.
Figure 4:
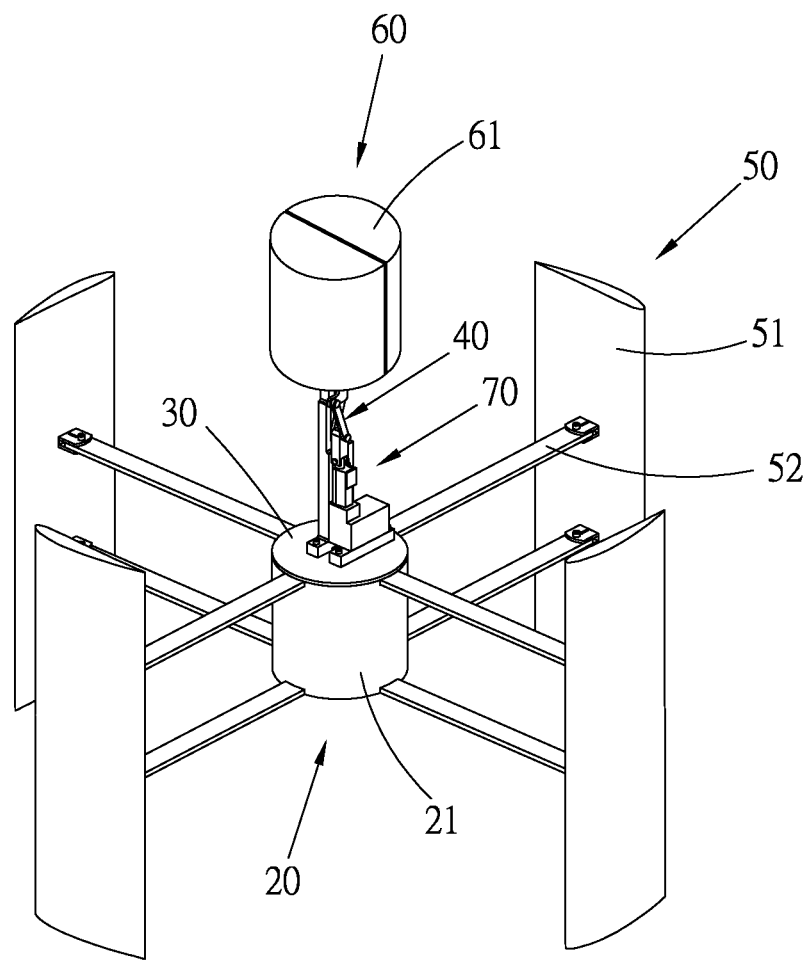
FIG. 4 is a perspective view of the preferred embodiment of the present invention, showing that the output shaft of the drive unit is positioned in a second position.

According to the above arrangement, the actuator 72 can drive the output shaft 73 to move between the first and second positions. When the output shaft 73 moves between the first and second positions, the two resistance type blades 61 are driven between the stretched position and the unstretched position. To speak more specifically, as shown in FIGS. 1 and 3, when the output shaft 73 is positioned in the first position, the two resistance type blades 61 are positioned in the stretched position. Under such circumstance, the two resistance type blades 61 are drivable by wind force to continuously rotate. Referring to FIGS. 4 and 5, when the actuator 72 drives the output shaft 73 to move from the first position to the second position, the base section 41 is synchronously moved to drive the links 42. At this time, the two resistance type blades 61 are moved from the stretched position to the unstretched position. Under such circumstance, the two resistance type blades 61 cannot be driven and rotated by the wind.

At high rotational speed, in case the resistance type blades 61 are continuously driven and rotated by the wind, the resistance type blades 61 will apply a resistance to the entire system. This is unbeneficial to the power generation efficiency. Therefore, in the vertical wind power generator 10 with automatically unstretchable blades of the present invention, it is decided whether the drive unit 70 should be turned on to move the output shaft 73 between the first and second positions according to the value of the rotational speed. Accordingly, the linkage mechanism 40 can be driven to stretch or unstretch the two resistance type blades 61 according to the rotational speed. In other words, in the case that the rotational speed is higher than a predetermined value, the drive unit 70 is turned on to move the resistance type blades 61 to the unstretched position. Under such circumstance, the two resistance type blades 61 will not be driven and rotated by the wind so that the resistance applied to the system can be reduced and the power generation efficiency can be increased. On the other hand, in the case that the rotational speed is lower than the predetermined value, the drive unit 70 will not be turned on, whereby the resistance type blades 61 are kept in the stretched position. Under such circumstance, the two resistance type blades 61 are still drivable by the wind to have better actuation ability.

It should be noted that in the above embodiment, the vertical wind power generator 10 includes an outer rotor generator 20 as a component. However, the generator is not limited to the outer rotor generator. Alternatively, the generator can be an inner rotor generator to achieve the same effect.

The above embodiments are only used to illustrate the present invention, not intended to limit the scope thereof. Many modifications of the above embodiments can be made without departing from the spirit of the present invention.

What is claimed is:

1. A vertical wind power generator with automatically unstretchable blades, comprising:
   a generator having a stator and a rotary section with a rotational shaft normal to the horizon;
   a lifting type blade assembly including several lifting type blades and several brackets respectively bridged between the lifting type blades and the rotary section; and
   a resistance type blade assembly including two resistance type blades symmetrically positioned on two sides of the rotational shaft of the rotary section, the vertical wind power generator being characterized in that the vertical wind power generator further comprising a linkage mechanism and a drive unit, the linkage mechanism being bridged between the resistance type blades and the rotary section, the drive unit serving to provide power for driving the linkage mechanism, the drive unit having an output shaft reciprocally movable between a first position and a second position, when moved to the first position, the output shaft driving the linkage mechanism to move the resistance type blades to a stretched position where the resistance type blades are symmetrically positioned on two sides of the rotational shaft of the rotary section, when moved to the second position, the output shaft driving the linkage mechanism to move the resistance type blades to an unstretched position where the resistance type blades are mated with each other about the rotational shaft of the rotary section.

2. The vertical wind power generator with automatically unstretchable blades as claimed in claim 1, further comprising a disc seat disposed on the rotary section in a predetermined position.

3. The vertical wind power generator with automatically unstretchable blades as claimed in claim 2, wherein the drive unit has a main body mounted on the disc seat, and an actuator disposed on the main body for driving the output shaft to reciprocally move between the first and second positions.

4. The vertical wind power generator with automatically unstretchable blades as claimed in claim 3, wherein the linkage mechanism includes a base section disposed at an end of the output shaft of the actuator, and two links each having a first end and a second end, the first ends of the links being respectively pivotally connected to two sides of the base section in opposite to each other, the second ends of the links being respectively pivotally connected to the two resistance type blades.

5. The vertical wind power generator with automatically unstretchable blades as claimed in claim 1, wherein the generator is an outer rotor generator.

6. The vertical wind power generator with automatically unstretchable blades as claimed in claim 1, wherein the generator is an inner rotor generator.

* * * * *